Aug. 5, 1958     C. H. BRAUER     2,845,827
CENTERING GUIDE FOR MACHINING HEAD
Filed March 22, 1957     2 Sheets-Sheet 1
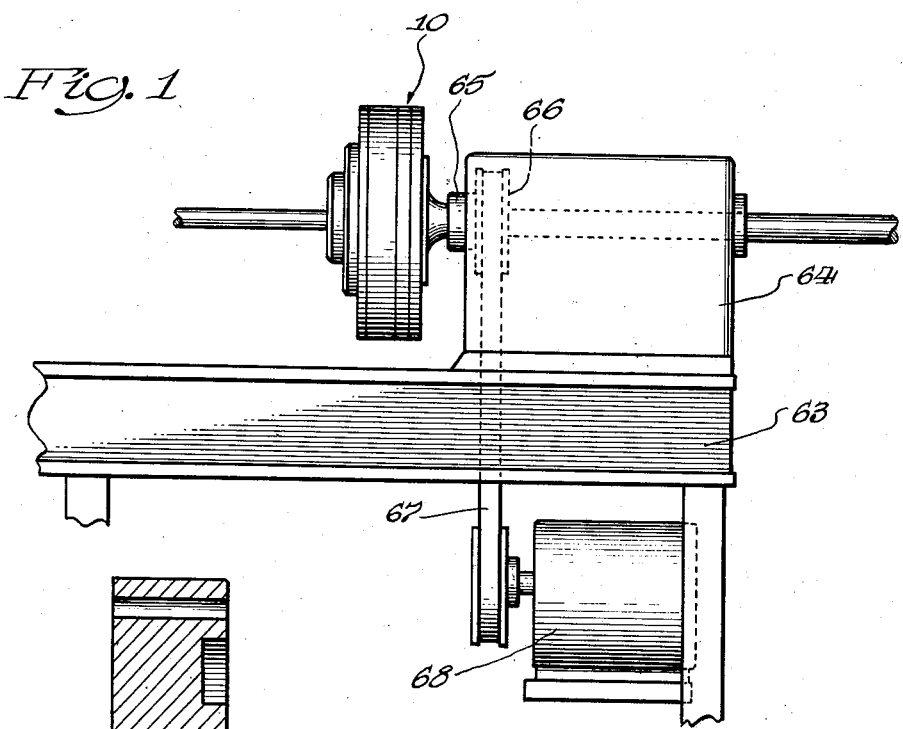
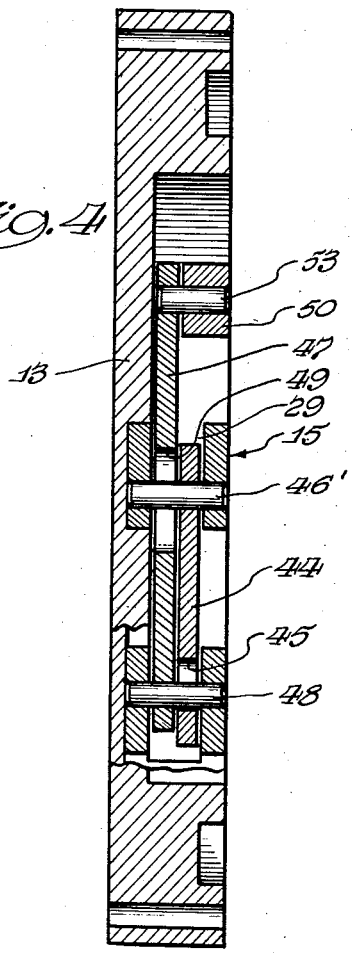
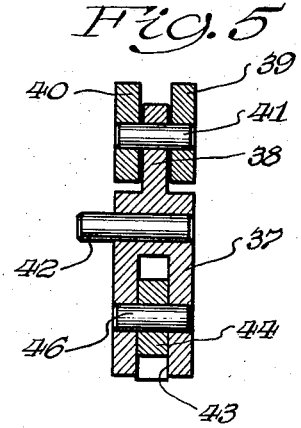
Inventor
Clarence H. Brauer
Paul O. Pippel
Attorney Aug. 5, 1958     C. H. BRAUER     2,845,827
CENTERING GUIDE FOR MACHINING HEAD Filed March 22, 1957     2 Sheets-Sheet 2

Inventor
Clarence H. Brauer
Paul O. Pippel
Attorney

United States Patent Office 2,845,827
Patented Aug. 5, 1958

2,845,827

CENTERING GUIDE FOR MACHINING HEAD

Clarence H. Brauer, Chicago, Ill., assignor to International Harvester Company, Chicago, Ill., a corporation of New Jersey Application March 22, 1957, Serial No. 647,775

2 Claims. (Cl. 82—20)

This invention relates to a machining head and more particularly to a centering device for guiding material through the machining head.

In the manufacture of long steel rods and bars it is necessary to subject the bars to a machining operation usually accomplished by a turning lathe wherein portions of the peripheral surface are removed. Such an operation generally is accomplished at the steel mill where surface imperfections exist in the bars immediately after the rolling operation. Bars and rods of this type have been very difficult to machine or turn on a lathe since difficulties would be encountered in centering the work pieces properly with respect to the cutting elements or cutting head of the lathe. Such difficulties in centering were largely the result of uneven contours of the bars and differences in the dimensional tolerances occurring as a result of the rolling mill operations. It is a prime object of this invention to provide an improved machining head having a novel centering arrangement for keeping a work piece centered during the machining or turning lathe operation.

A still further object is to provide a novel machining head having centering means adapted to engage a work piece fed through the head, the centering means being able to accommodate variations in dimensional tolerances which might exist in the work piece that is fed through the head.

Still another object is the provision of an improved centering device for centering a work piece relative to a machining cutter, the centering device including radially adjustable elements interconnected in a manner wherein they are moved in synchronous relation during differences in dimensional tolerances in a work piece as the work piece is moved through the cutters of a turning head.

A still further object is to provide an improved centering device for centering a work piece, the device including a plurality of radially adjustable guide elements, the said guide elements being interconnected by linkage mechanisms adapted to provide for equal radial movement and adjustment of the said guide elements during variations in the size of the work piece whereby the work piece will remain in a central position with respect to the cutters of a machining mechanism.

These and other objects will become more readily apparent from a reading of the description when examined in connection with the accompanying sheets of drawings.

Figure 1 is a side elevational view of a portion of a machining device such as a lathe having a machining head connected thereto for turning movement;

Figure 4 is a fragmentary sectional view taken substantially along the line 4—4 of Figure 3, the said view having certain parts deleted to more adequately set forth portions of the invention, and Figure 5 is a cross sectional view taken substantially along the line 5—5 of Figure 3.

Figure 2:
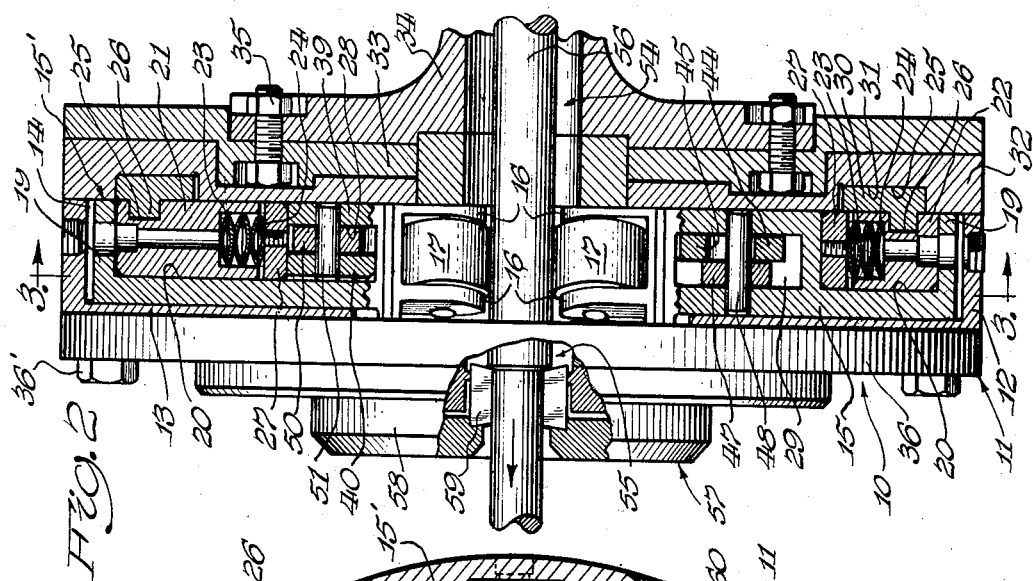
Figure 2 is a cross sectional view through a machining and turning head showing portions of an improved centering device for keeping a work piece centered with respect to the cutting elements of the machining head.
Figure 3:
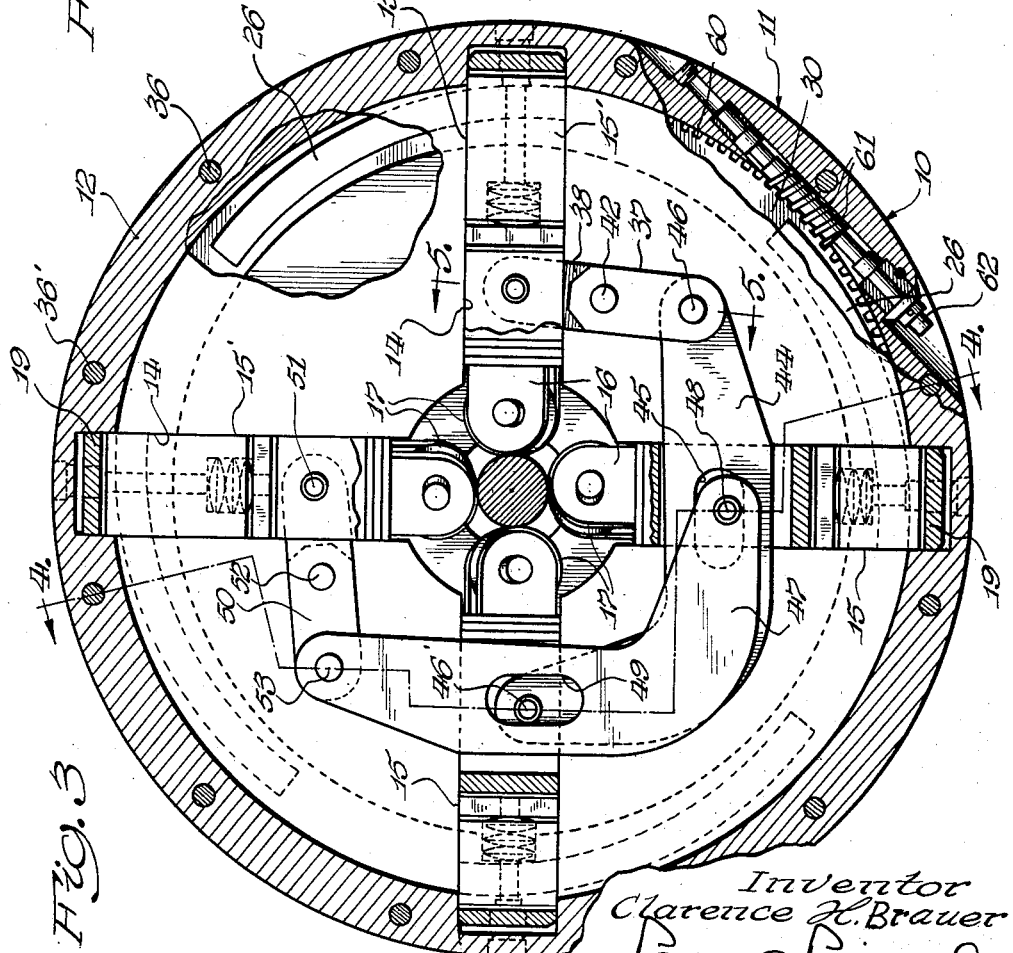
Figure 3 is a cross section sectional view taken substantially along the line 3—3 of Figure 2, the view also having certain portions broken away to clearly illustrate the invention.

A machining head or metal cutting device is generally designated by the reference character 10. A machining head 10 comprises a rotatable cylindrical casing 11, shown in Figures 1, 2 and 3. The casing 11 comprises a casing member 12 provided with a front wall 13. As best shown in Figure 3 the casing member 12 comprises a plurality of radially extending guide ways or recesses disposed in relative spaced 90° relation. Roller holders 15 are provided for reciprocating movement in two adjacent recesses 14 and roller holders 15' are disposed in the other two recesses, with the holder 15 disposed in opposed relation with respect to the holders 15'.

The inner portions of each holder 15 and 15' are provided with laterally spaced ears 16 on each of which is suitably journalled a roller 17. Each of the roller holders 15 and 15' is provided at its outermost end with a flange 19 forming one end of a recess portion 20 provided on each of the roller holders 15 and 15'. The roller holders 15' are provided with movable blocks 21 which are disposed in the recess portions 20. Similarly the holders 15 are provided with movable blocks 22 disposed in the recess portions 20. Each block 21 is provided with a socket 23 in which are seated a plurality of spring disks 24. Each of the blocks 21 also comprises a cam recess 25 which is adapted to be engaged by a cam 26. The blocks 21 and 22 are held on the cams 26 and the spring disks 24 exert an upward pressure against bearing pads 27 also disposed in the recess portions 20. Thus the holders 15 and 15' are constantly urged in a radial direction toward the axis of the cylindrical casing 11.

Each of the roller holders 15 and 15' are also provided with recesses 28 and 29 disposed immediately adjacent the rollers 17. As best shown in Figure 3, a cam plate 30 has connected for rotation therewith the cams 26 and each of the cams 26 is in camming engagement with a cam recess 25 provided on the blocks 21 and 22.

The cam plate 30 is of annular shape and is rotatable in a recess 31 provided in a back-up plate 32. As best shown in Figure 2, immediately adjacent the back-up plate 32 is a rear wall 33 to which is connected a driving member 34 by means of suitable bolt members 35. The front wall 13 has suitably connected thereto a cutting head securing plate 36, the said plate 36, the casing member 12, the back-up plate 32 and the rear wall 33 being suitably connected together by means of a plurality of bolts 36'.

Referring now particularly to Figures 2, 3, 4 and 5, a link 37 is provided with a narrow or reduced portion 38. The link 37 is pivotally connected to a portion 39 of the holder 15' and to a spacer 40 by means of a pin 41. The link is also pivotally connected to the cylindrical casing member 12 by means of a pivot pin 42. The link 37 is also suitably slotted as indicated at 43 and has connected thereto one end of an L-shaped arm 44. The L-shaped arm 44 is also suitably slotted as indicated at 45 for suitable clearance purposes as will presently appear. Pivotal connection of one end of the arm 44 to the link 37 is by means of a pivot pin 46 as best shown in Figures 3 and 5. The other end of the L-shaped arm 44 is pivotally connected to laterally spaced portions of a holder 15, as best shown in Figure 4 by means of a pivot pin 46'. As shown in Figure 2 the L-shaped arm 45 extends through the recess 29 of one of the holders and is connected to the other holder 15, spaced 90° with respect to the first holder by means of the pivot 46'.

A second L-shaped arm is designated at 47. The second L-shaped arm 47 is suitably connected to portions of one of the holders 15 by means of a pivot pin 48 as shown in Figure 2. The pivot pin 48 also extends through the slot 45, the said slot acting as a clearance provision for the arm 44 to permit free movement thereof with respect to the other arm 47. The L-shaped arm 47 also is provided with a clearance slot 49, to provide suitable clearance with respect to the pin 46', the said arm 47 also extending through a recess 29 of the said arm 15. A link 50, by means of a pivot 51, is pivotally connected to the portion 39 of one of the arms 15' and also to the spacer 40. The link 50 also is provided with a reduced end portion as best shown in Figure 2 for movement in the space disposed between the portion 39 and the spacer 40. The link 50 is also suitably connected for pivotal movement on the casing member 12 by means of a pin 52 and a pin 53 suitably connects one end of the link 50 to the L-shaped arm 47.

The member 36, casing 12, plate 32 and driving member 34 are suitably provided with openings in registry to provide a bore or opening extending through the head 10, one end of the opening being designated at 54 and the other end of the opening being designated at 55. Thus as is best shown in Figure 2 a work piece 56 in the form of a cylindrical rod may be fed through the openings, as also shown in Figure 1.

A cutting head 57 is suitably connected to the member 36. The cutting head 57 comprises a tool holder 58 for suitably carrying and holding a plurality of cutting tools 59.

As shown in Figure 3 the cam plate 30 is also provided at its periphery with a plurality of teeth 60 which are engaged by means of a spiral gear 61 suitably carried by an adjusting mechanism 62 disposed for rotation in the cylindrical casing 11.

Referring now to Figure 1, the machining or cutting head 10 is positioned for rotation on a lathe bed 63. The lathe bed 63 may be of conventional design comprising a support 64 which rotatably mounts the head 10. Suitable journal means 65 has connected thereto a pulley 66 which is driven by means of a belt 67 from an electric motor 68. The mechanical means for rotating the head 10 may be of conventional design and have only been generally described.

During the operation the newly produced bar or work piece 56 is pushed through the openings 54 and 55 by a suitable feeding device (not shown). The head 10 and the rollers 17 are in rotating engagement with the work piece as it is fed through the device. Radial adjustment of the roller holders 15 and 15' is accomplished by turning of the spiral gear 61 by means of a suitable tool whereupon the cams 30 move in the cam recesses 26. The cams 26 as best shown in Figure 3 are disposed in relative offset relation with respect to their ends and with respect to the axis of the head so that upon rotation of the cam plate 30 inward and outward movement of the holders is achieved. Thus for various sizes of work pieces the holders may be adjusted to accommodate such sizes.

The holders are constantly urged into engagement by the work piece by means of the springs 24. During slight changes in the shape of the work piece the bearing pads 27 are sufficiently spaced from the blocks 21 and 22 so that relative movement between the holders and the blocks is possible.

As above indicated the holders 15 and 15' are interconnected by means of the links for synchronous movement. It is desired to maintain the work piece 56 centered at all time despite the fact that the size of the piece may vary and also the shape may vary. Thus if a portion of the piece is of greater diameter, one of the holders 15' may of course move radially outwardly to accommodate such change in size. Simultaneously with such movement of one of the holders 15' the opposed holder 15 also is moved the same distance because of the interconnected relation of the link 50 and L-shaped arm 47. Similarly the other holder 15 when moved to accommodate such change in size would cause an equal amount of movement of the opposed holder 15' by virtue of the L-shaped arm 44 and the link 37. Thus it is apparent that any change in size of the work piece immediately affects adjustment of the holders to the same degree so that at all times the piece will remain on center for proper cutting of the cutting tools 59. Thus any movement which is imparted to one holder is immediately imparted also to the opposed holder so that any variations in size or shape will be accommodated for without dislocation of the work piece off center with respect to the cutters 59.

Thus it is believed obvious that an improved machining head and adjustable guide therefor have been described. Thus the objects have been fully achieved and it must be realized that changes and variations in the structure may be made without departing from the spirit of the invention as disclosed or the scope of the appended claims.

What is claimed is:

1. A machining head comprising a rotatable cylindrical casing, said casing including a front wall and a rear wall having aligned openings, cutting tools positioned adjacent the openings of said front wall to engage a work piece fed through said openings, said casing including radially extending guide grooves disposed in approximately 90° relation, a roller holder reciprocally positioned in each guide groove, a roller connected to an inner end of each holder, each holder having a recess adjacent its other end, a spring retainer disposed in said recess, said holder and said retainer having limited relative longitudinal movement, each retainer having a cam recess, a cylindrical cam member rotatably positioned on said housing, a plurality of cams rotatable with said cam member, each cam engaging one of said cam recesses, a spring element on said retainer normally urging said holders toward said openings, means for rotating said cam member relative to said holders whereupon said holders may be moved inwardly and outwardly relative to said openings, means for synchronizing the movement of said holders comprising a first link pivotally connected to said casing and having one end pivotally connected to a first holder, a first L-shaped arm having one end pivotally connected to the other end of said link and the other end of the L-shaped arm pivotally connected to a second holder positioned in opposed relation to said first holder, a second link pivotally connected to said casing, said second link having one end pivotally connected to a third holder, a second L-shaped arm having one end pivotally connected to the other end of said second link, and means pivotally connecting the other end of said second L-shaped arm to a fourth holder disposed opposite said third holder, whereupon movement of one holder in one groove in response to engagement with a workpiece results in similar movement of an opposed holder.

2. A machining head comprising a rotatable casing having an axially extending opening, cutting tools positioned adjacent said opening adapted to engage a work piece fed through said opening, a plurality of radially extending and circumferentially spaced guide elements disposed on said casing for relative radial movement, a movable member connected to each guide element, biasing means between said movable member and a portion of each said guide element urging said guide elements toward the axis of said casing, means for adjusting said guide elements relative to the axis of said casing including movable camming means engaging each of said movable members, means for synchronizing said guide elements disposed in opposed relation whereby they are moved in concert, comprising a first link pivotally connected at one end to one of said guide elements and pivotally connected to said casing, an L-shaped arm having one end pivotally connected to the other end of said first link and at its opposite end being connected to a guide element opposite said first guide element, a second link having one end pivotally connected to a second guide element and to said casing and a second L-shaped arm pivotally connected at one end to the other end of said second link and being pivotally connected at its other end to a guide element positioned in opposed relation to said second guide element.

References Cited in the file of this patent

UNITED STATES PATENTS

| | | |
|---|---|---|
| 594,333 | Delay | Nov. 23, 1897 |
| 2,264,651 | Webb | Dec. 2, 1941 |
| 2,338,687 | Johnson | Jan. 4, 1944 |
| 2,459,068 | Eastwood | Jan. 11, 1949 |
| 2,547,529 | Lichtenberg | Apr. 3, 1951 |
| 2,601,716 | Laningham | July 1, 1952 |

FOREIGN PATENTS

| | | |
|---|---|---|
| 540,599 | Germany | Dec. 24, 1931 |
| 889,055 | France | Sept. 20, 1943 |